United States Patent [19]

Laughlin

[11] 4,382,857
[45] May 10, 1983

[54] METHOD AND APPARATUS FOR EXTRACTING FIBER PRODUCT

[76] Inventor: Sidney J. Laughlin, P.O. Box 218, Rogers, Tex. 76596

[21] Appl. No.: 325,318

[22] Filed: Nov. 27, 1981

Related U.S. Application Data

[63] Continuation-in-part of Ser. No. 273,360, Jun. 15, 1981.

[51] Int. Cl.³ .............................................. B07B 9/00
[52] U.S. Cl. ....................... 209/23; 55/290; 55/302; 209/27; 209/31; 209/35; 209/137; 209/139 R
[58] Field of Search ................. 209/23, 26, 27, 30, 209/31, 35, 137, 139 R; 55/290, 302, 293, 352

[56] References Cited

U.S. PATENT DOCUMENTS

| | | | |
|---|---|---|---|
| 3,173,861 | 3/1965 | Hager et al. | 209/137 |
| 3,262,457 | 7/1966 | Gamberini | 209/137 |
| 4,251,356 | 2/1981 | Harte | 209/250 |
| 4,253,855 | 3/1981 | Jackson et al. | 55/290 |
| 4,268,294 | 5/1981 | Laughlin et al. | 65/10 |

Primary Examiner—Robert L. Lindsay, Jr.
Attorney, Agent, or Firm—Hubbard, Thurman, Turner & Tucker

[57] ABSTRACT

Self-cleaning separator apparatus is used in combination with a vertical settling chamber for extracting fiber product from a moving air stream. The separator apparatus includes a housing forming an air stream inlet, a product discharge outlet and a clean air outlet. A rotatable screen is interposed between the air stream inlet and the clean air outlet for collecting the fiber product on the screen as the air stream flows through the screen for discharge into the atmosphere. An air flow gradient is induced in the settling chamber whereby the air flow rate through the rotating screen is substantially smaller near the bottom of the settling chamber than it is near the top of the settling chamber. The gradient is produced in part by a transversely extending baffle plate mounted in the annular flow region near the product discharge outlet, and in part by the off-center placement of the rotary screen closely adjacent the sidewalls of the settling chamber which converge toward the product discharge outlet. The off-center placement of the rotary screen, relative to the settling chamber sidewalls, and the presence of the baffle plate within the annular flow region reduce the air stream flow rate at the entrance to the product discharge outlet. The accumulated fiber product drops off of the rotating screen and falls into the product discharge outlet by gravity flow as the screen turns through the low flow rate region.

8 Claims, 6 Drawing Figures

4,382,857

METHOD AND APPARATUS FOR EXTRACTING FIBER PRODUCT

CROSS-REFERENCE TO RELATED APPLICATION

This is a continuation-in-part of application Ser. No. 273,360, filed June 15, 1981.

BACKGROUND OF THE INVENTION

1. Field of the Invention

The present invention relates generally to mineral fiber production, and in particular to method and apparatus for extracting fiber product from a moving air stream.

2. Description of the Prior Art

In the art of producing mineral fiber, a spinning unit is utilized for fiberizing molten slag with air or steam. The fiber is conveyed through a flow chamber or collection chamber by down draft fans to a conveyor belt where it is removed by various methods and put into a conventional bagger. A limitation of this arrangement is that it is not a closed system, and the lint or airborn flywool by-product cannot be completely contained, thereby allowing a large quantity of fugitive airborne particles to be emitted into the atmosphere and contributing to pollution of the environment. Because of its damaging ecological effect, this airborne, fugitive fly by-product must be captured or recovered before the air stream, in which it is entrained, is discharged into the atmosphere.

Rotary filters have been developed for limiting such emissions to safe levels while allowing the mineral fiber process to be operated efficiently on a large scale. An example of a rotary filter assembly which is very effective in limiting emissions of airborne lint particles is illustrated and described in my co-pending application Ser. No. 273,360. In the operation of this type of rotary filter, high air stream flow rates are required because of the large mass of fiber product transported by the air stream. Most of the fiber product is agglomerated and is settled out in a settling chamber by gravity flow. However, a substantial amount of fiber product is airborne and accumulates in a blanket around the rotary screen. Because of the relatively high air stream flow rate, the fiber blanket which accumulates around the screen is maintained there by the pressure differential which arises as the air stream flows through the screen. This pressure differential, unless relieved, opposes gravity flow and the thickness of the fiber product blanket builds up until the flow of the moving air stream becomes choked off.

Various attempts have been made to clear the rotating screen, including directing a blast of air through the screen from an airblast tube located inside of the rotating drum. This approach has been somewhat successful for "wet" fiber product (i.e. fiber product produced by steam fiberizing). However, for "dry" fiber product produced by air fiberizing, it has been found that the dry air processed fiber product, because of its relatively low mass and dryness, tends to remain airborne within the settling chamber until the settling chamber fills, even though a portion of the rotary screen is being cleared continuously by the airblast tube. The turbulent movement of the dry fiber product within the settling chamber results in the settling chamber filling up faster than the dry product can be discharged, thus causing shut-down of the production line.

OBJECTS OF THE INVENTION

It is, therefore, the principal object of the present invention to provide method and apparatus for extracting entrained fiber product from a moving air stream.

A related object of the invention is to provide a self-cleaning, rotary screen separator assembly in which airborne fiber product entrained within a moving air stream is efficiently removed from the screen prior to discharge.

Yet another object of the invention is to provide a closed system for processing mineral fiber product in which airborne fiber particles entrained within the product stream are carefully controlled at all times, with the fiber product and the effluent air stream carrying the product being discharged with virtually no emission of fugitive fiber particles.

SUMMARY OF THE INVENTION

Self-cleaning separator apparatus is used in combination with a vertical settling chamber for extracting fiber product from a moving air stream. The separator apparatus includes a housing forming an air stream inlet, a product discharge outlet and a clean air outlet. A rotatable screen is interposed between the air stream inlet and the clean air outlet for collecting the fiber product on the screen as the air stream flows through the screen for discharge into the atmosphere. The accumulated fiber deposit is presented to the product discharge outlet as the screen turns. Bulk fiber product settles to the bottom of the chamber and is discharged through a rotary valve in the product discharge outlet.

An air flow gradient is induced in the settling chamber whereby the air flow rate through the rotating screen is substantially smaller near the bottom of the settling chamber than it is near the top of the settling chamber. The gradient is produced in part by a transversely extending baffle plate mounted in the annular flow region near the product discharge outlet, and in part by the off-center placement of the rotary screen closely adjacent to the sidewalls of the settling chamber which converge toward the product discharge outlet. The off-center placement of the rotary screen relative to the settling chamber sidewalls established flow strictures on opposite sides of the discharge outlet thereby reducing air flow at the entrance to the product discharge outlet. Air flow in this region is further diminished by the blocking effect of the baffle plate. The accumulated fiber product drops off of the rotating screen and falls into the product discharge outlet by gravity flow as the screen turns through the low flow rate region.

In a preferred embodiment, the rotating screen comprises a drum having a cylindrical screen surface for accumulating a lint deposit, with both ends of the drum being sealed against the settling chamber housing by a resilient, rotary sealing member. The fiber product is discharged from the settling chamber through a rotary lock valve. The product stream is completely enclosed at all times and is conveyed through conduits which are maintained at a pressure below atmospheric, thereby inhibiting the emission of lint and other particulate material.

The novel features which characterize the invention are defined by the appended claims. The foregoing and other objects, advantages, and features of the invention will hereinafter appear, and for purposes of illustration of the invenion, but not of limitation, an examplary embodiment of the invention is shown in the appended drawings.

DETAILED DESCRIPTION OF THE PREFERRED EMBODIMENTS

Figure 1:
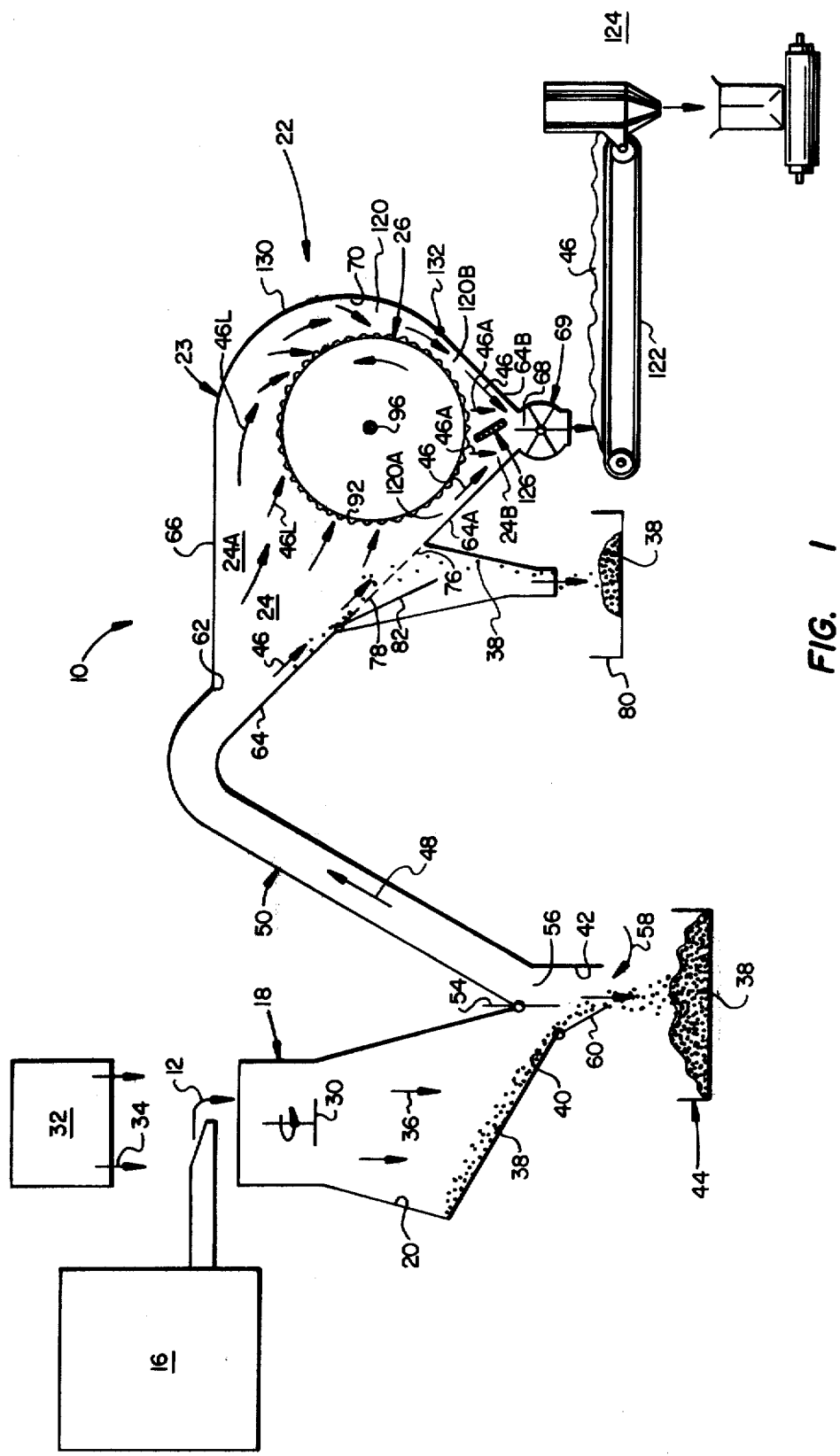
FIG. 1 is a schematic view of a mineral fiber manufacturing system constucted according to the teachings of the invention.

In the description which follows, like parts are marked throughout the specification and drawings with the same reference numerals, respectively. The drawings are not necessarily to scale and in some instances, portions have been exaggerated in order to more clearly depict certain features of the invention.

Figure 2:
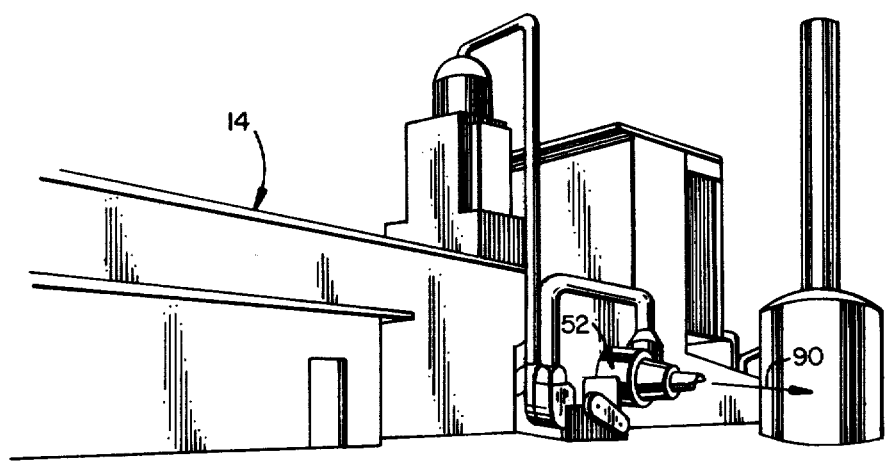
FIG. 2 is a perspective view of a mineral fiber manufacturing plant incorporating the system shown in FIG. 1.

Referring now to FIGS. 1 and 2 of the drawings, a system 10 for producing mineral fiber product from a stream of molten slag 12 in a plant enclosure 14 is disclosed. The system includes as major components a cupola 16, an attenuator 18 for elongating the slag to produce the mineral fiber product, a cone 20 for precooling the fiber product, a separator assembly 22 having a chamber 24 for settling out the relatively dense fiber product, and a rotary screen 26 for recovering the airborne flywool entrained in air discharged from the settling chamber, thereby inhibiting the release of fugitive flywool particles into the atmosphere.

Molten slag 12 is tapped from the cupola 16 through a spout 28. A stream of molten slag 12 issues through the spout into the open top of the slag attenuator 18. The stream of molten slag falls onto the rotating blades of a spinner 28. At the same time, back pressure air flow indicated by the arrows 30 is directed across the spinner by an air ring 32. In response to the resultant forces imparted to the slag by the spinner 30 and the back pressure air flow 34, the stream of slag 12 is divided into multiple fiber streams 36 and are projected at a high velocity into the water cooled cone 20. As the finely divided streams 36 of slag accelerate through the cone 20, the leading mass cools and solidifies as "shot" at the forward end of the fiber trailing behind it. This produces the desired elongated fiber configuration. This fiber elongating process is generally referred to herein as "attenuation".

It should be understood that other attenuating methods may be used to good advantages to produce the fiber product. For example, the slag may be attenuated solely by the action of a centrifugal force as imparted by the spinner 30 or solely by an aerodynamic force, as imparted by the air ring 32, or by a combination of the two as illustrated in FIG. 1. The aerodynamic force may be applied to the slag by high speed, high temperature gaseous jets of heated air or other gases, for example steam.

The "shot" produced by the attenuation of the slag comprises small irregular, but often spherical granules or nodules 38. Because the shot is detrimental to the quality of the mineral fiber produced, it is removed from the product flow by allowing it to fall under the influence of gravity along a slide 40 where it is discharged through a damper opening 42 into a shot bin 44.

As a result of the attenuation process, a large amount of airborne mineral wool particles are created which do not initially agglomerate with the bulk mineral fiber. Because of its damaging ecological effect, this airborne, fugitive fly by-product must be captured or recovered before the air stream, in which it is entrained, is discharged into the atomsphere.

Figure 3:
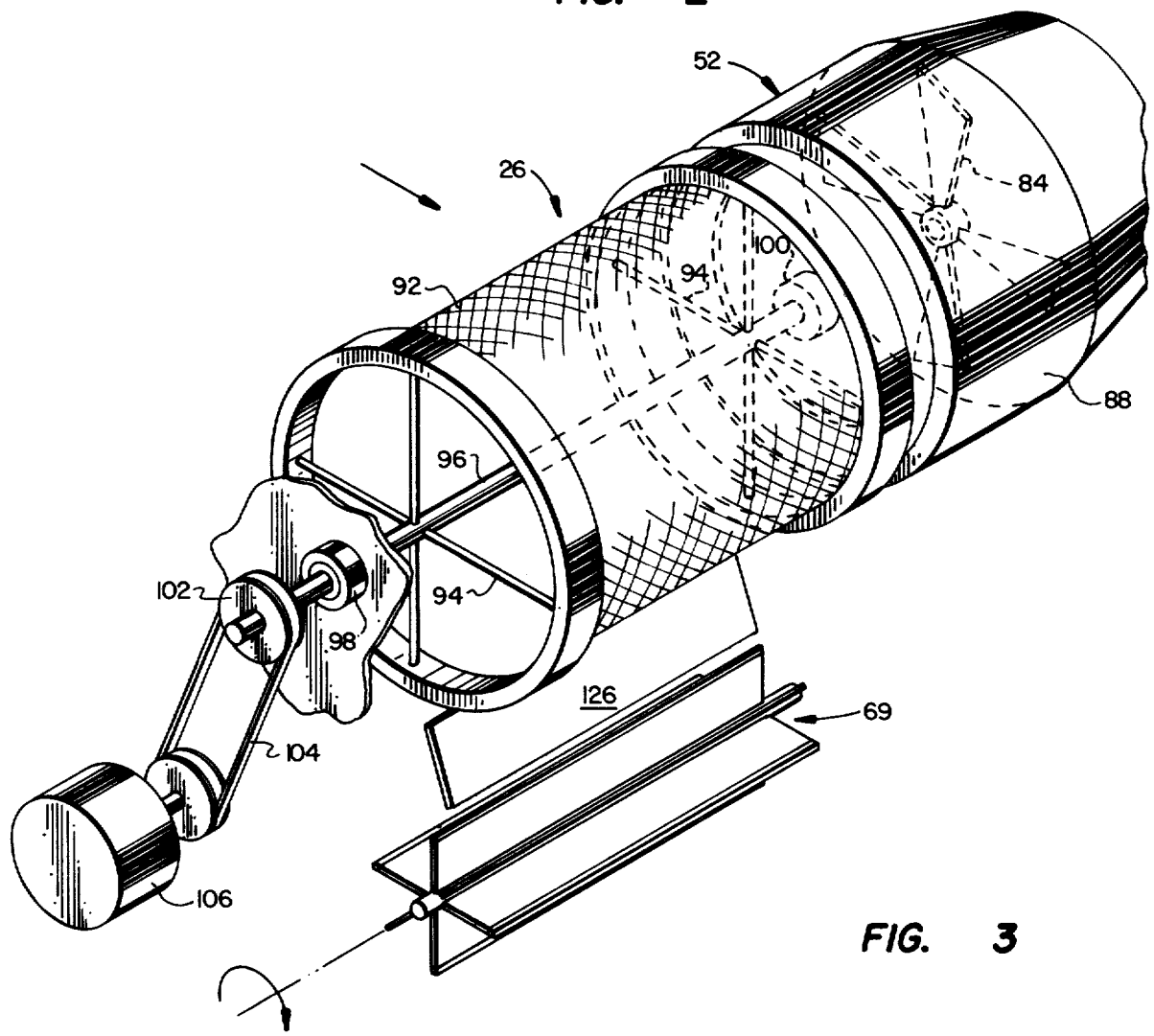
FIG. 3 is a perspective, operational view of a rotary screen separator assembly.

The bulk mineral fiber product and the mineral wool fly by-product are referred to collectively as rough product 46, and the air stream in which the fiber is entrained is designated by the arrow 48. The rough product combination 46 is conveyed to the settling chamber 24 through a collector conduit 50. A draft is induced through the collector conduit 50 by a fan blower assembly 52 (FIG. 3). The rate at which the rough product 46 is withdrawn from the cooling cone 20 is controlled by a slide damper 54 located at the inlet port 56 to the collector conduit 50. Cooling air 58 is admitted through the shot discharge opening and inlet port 42, and a damper 60 mounted in the shot discharge opening and inlet port 42 controls the volume and velocity of cooling air flow.

The bulk fiber product 46 undergoes further cooling as it moves upwardly through the collector conduit 50. The collector conduit 50 is arranged to discharge the entrained bulk fiber product 46 through an air stream inlet 62 at the upper level of the settling chamber 24. The entrained fiber product is preferably discharged tangentially along the lower inner wall 64 of the settling chamber housing. Because the fiber product 46 is relatively dense, it moves downwardly along the inner wall 64 to the bottom of the chamber 24 while airborne flywool particles 46L, being relatively less dense, travel through the interior of the settling chamber 24 bounded by the upper wall 66. The bulk fiber product 46 falls by gravity flow to the bottom 24B of the chamber 24 and is discharged through a fiber product outlet 70 into a rotary valve 69 for further processing.

The airborne fiber lint particles 46L travel generally upwardly through the upper region 24A of the settling chamber and around the annulus 70 between the rotary filter 26 and the settling chamber housing 23. The chamber 24 is completely enclosed by the housing 23, including side panels 72, 74 as illustrated in FIG. 4.

The lower housing panel 54 is fitted with a shot discharge opening 76 which is covered with a coarse screen 78. Shot 38 falls along the lower panel 64 and through the screen 78 into a shot bin 80. The opening 76 is partially closed by a damper 82 to limit the amount of air drawn through the opening. Bulk fiber product 46 slides downwardly over the screen to the bottom region 24B of the settling chamber into the discharge opening 76.

Figure 4:
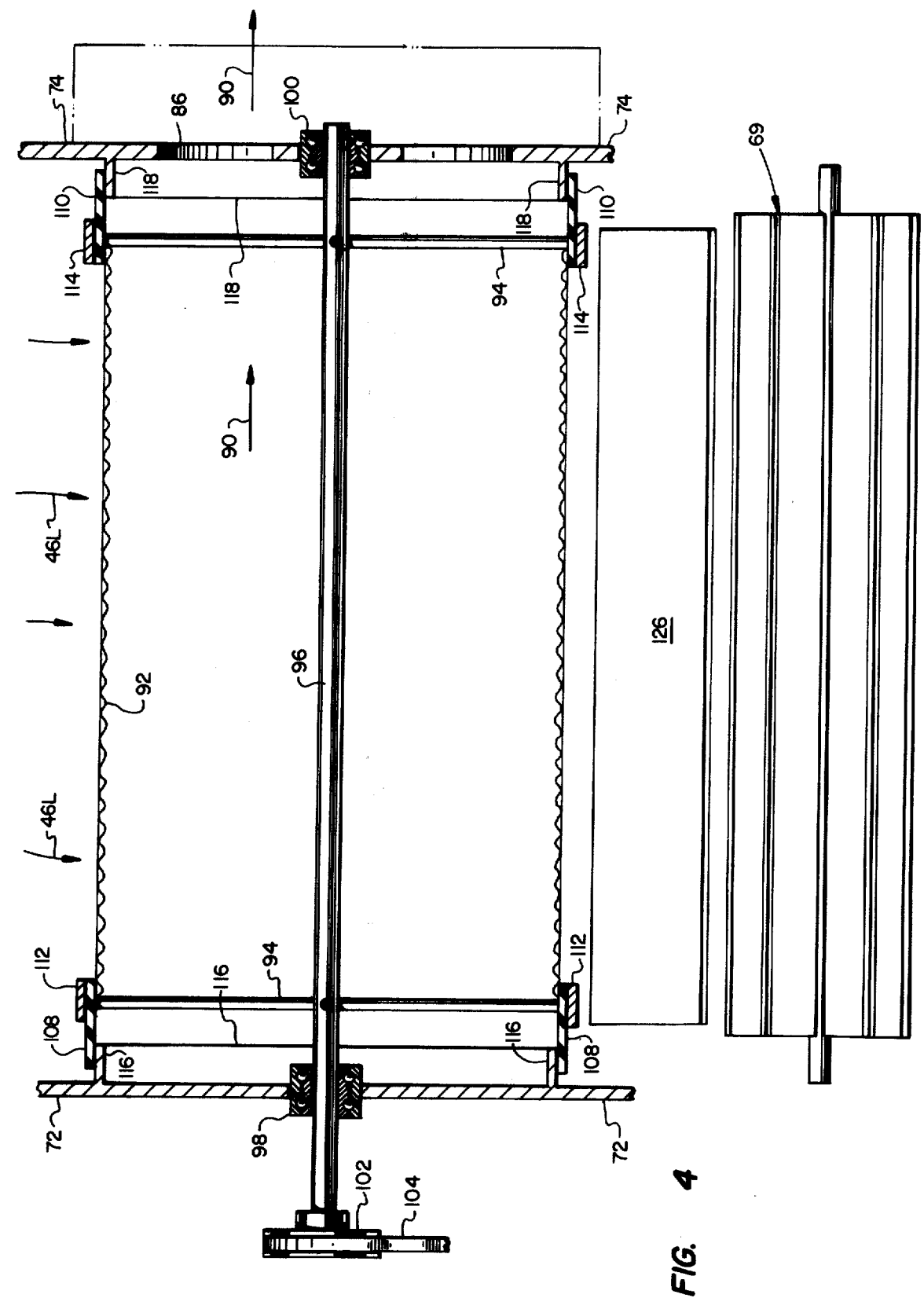
FIG. 4 is a side elevation view, partially in section, of the rotary screen separator assembly shown in FIG. 3.

Thus, it will be seen that the entire system, including the interior of the settling chamber 24, is maintained at a lower than atmospheric pressure as air is pulled through the system by a suction fan 84 which is coupled to the air stream outlet 86 in the chamber side panel 74 (FIGS. 3 and 4). The suction fan 84 is enclosed within a shroud 88 which is sealed against the settling chamber side panel 74 around the air stream outlet 86. As the effluent air stream passes through the rotary screen 26, airborne fiber 46L is trapped on the surface of the screen and clean air, illustrated by the arrow 90, is discharged into the environment.

The preferred construction for the rotary screen assembly 26 will now be described. Referring to FIGS. 1, 3 and 4, the screen assembly 26 comprises a cylindrical screen 92 concentrically supported by spokes 94 about a horizontal shaft 96. The shaft 96 is journalled for rotation on conventional bearing assemblies 98, 100 at each end. A pulley 102 is secured to one end of the shaft 96 and is driven in rotation by a belt 104 and an electrical motor 106.

Each end of the cylindrical screen 92 is sealed by resilient collars 108, 110, respectively. The collars 108, 110 are preferably made of durable, flexible material such as Teflon, Hypalon or synthetic rubber. Each collar is securely fastened to the end of the drum assembly by clamping bands 112, 114, respectively. The resilient collars 108, 110 are disposed in slidable, sealing engagement with annular flanges 116, 118, respectively. The collars are mounted on the settling chamber housing panel 72, 74, respectively, in coaxial alignment with the rotary screen 92 and axially spaced from the ends of the screen. The air gaps between the flanges and the screen are sealed by the resilient collars 108, 110, so that the effluent air stream carrying the airborne lint 60 must pass through the screen 92 before it is discharged into the environment. The airborne fiber particles 46L are accumulated as a lint deposit on the surface of the screen 92 as the air stream passes through the screen.

The settling chamber housing 23 outwardly surrounds the rotary screen 92 and defines a generally annular flow passage 120 through which the fiber product settles. The rotatable screen 92 is interposed in the flow path of the effluent air stream whereby the airborne fiber particles 46L entrained in the air stream are accumulated on the screen surface as the air stream flows through the screen and through the clean air outlet 86. The fiber particles are accumulated as a lint deposit on the surface of the screen, and the deposit is presented to the discharge outlet 68 as the screen turns through the lower chamber region 24B. The fiber deposit falls from the screen through the product discharge outlet 68 and into the rotary valve 69. The rotary valve 69 discharges bulk fiber product 46 onto a conveyor 122 which carries the fiber product to an automatic bagging station 124 for further processing.

Because of the large mass of fiber product 46 transported by the air stream 48, high CFM air flow rates are required to transport the fiber product from the cooling cone 20 into the settling chamber 24. Most of the fiber product 46 slides downwardly along the sloping sidewall panel 64 into the fiber product discharge outlet 68. However, for relatively dry fiber product produced by hot air fiberizing, a substantial amount of fiber product is airborne and accumulates in a blanket deposit around the rotary screen 92. The fiber deposit is maintained around the screen by the pressure differential which arises as the air stream flows through the screen and out of the clean air outlet. Unless the pressure differential is relieved, the thickness of the fiber product blanket builds up the flow of the moving air stream becomes choked off. Moreover, the dry air processed fiber product, because of its relatively low mass and dryness, tends to remain airborne within the settling chamber. The turbulent movement of the dry fiber product within the settling chamber 24 results in the settling chamber filling up faster than the dry product can be discharged, thus causing shutdown of the production line.

According to the present invention, the rotary screen 92 is cleaned continuously as the screen turns through the lower region 24B of the settling chamber by an air flow gradient which is induced within the settling chamber whereby the air flow rate through the rotating screen 92 is substantially smaller near the bottom region 24B of the settling chamber than it is near the top region 24A of the settling chamber. The gradient is produced in part by a transversely extending baffle plate 126 which is mounted in the annular flow passage 120 near the product discharge outlet 68. Additionally, the pressure gradient is produced in part by the off-center placement of the rotary screen 92 closely adjacent the settling chamber sidewall panels 64A, 64B which converge toward the product discharge outlet. The off-center rotatable screen and the converging sidewall panels 64A, 64B in combination define stricture regions 120A, 120B in the annular flow passage 120 on opposite sides of the fiber product discharge outlet 68.

The placement of the rotary screen 92 closely adjacent the downwardly sloping sidewalls creates a pressure buffer in the annular flow passage 120 on both sides of the product discharge outlet 68 which causes the air stream velocity within the lower chamber region 24B to drop substantially. Additionally, the presence of the baffle plate 126 in a blocking position across the annular flow passage 120 further reduces air flow at the entrance to the product discharge outlet 68. Because of the substantially reduced air stream flow rate within the lower chamber region 24B, fiber product accumulated onto the screen 92 will drop off of the screen by gravity flow as the screen passes through the lower chamber region 24B.

Additionally, the rotary valve 69 produces a suction force at the product discharge outlet which enhances the low pressure condition within the lower chamber region 24B. The fiber product which accumulates as the screen turns counterclockwise through the upper chamber 24A is released because of the low pressure condition as the screen continues to turn downwardly through the low pressure region 24B. The accumulated fiber product which falls from the screen within the low pressure region 24B is indicated by the arrows 46A.

Referring now to FIGS. 3 and 4, the baffle plate 126 preferably extends across the entire width of the annular flow passage 120, and is positioned directly above the entrance to the product discharge outlet 68 between the rotary valve 69 and the lowermost portion of the screen 92. The baffle plate 126 is sloping toward the direction of the air stream inlet 92, and is radially spaced away from the surface of the screen and away from the rotary valve 69 to allow free rotation of the screen and of the rotary valve without interference.

The sloping sidewall panel sections 64A, 64B define the outer boundary for the stricture regions 120A, 120B. The sidewall panel 64B slopes upwardly from the fiber product discharge outlet 68 and is interconnected with the upper panel 66 by a curved sidewall panel section 130. The annular flow passage 120 bounded by the curved panel section 130 converges to the juncture point 132 which is coincident with the stricture region 120B.

The pressure buffer effect caused by the stricture regions 120A, 120B and by the blocking effect of the baffle plate 126 greatly reduces the velocity of the air stream in the lower chamber region 24B, thereby relieving the pressure differential across the rotary screen 92 which tends to hold the fiber deposit onto the screen. As the screen turns through this low pressure region, the fiber deposit is released, and it falls into the product discharge outlet 68 by gravity flow, thus clearing the lower half of the screen continuously as it rotates.

Figure 5:
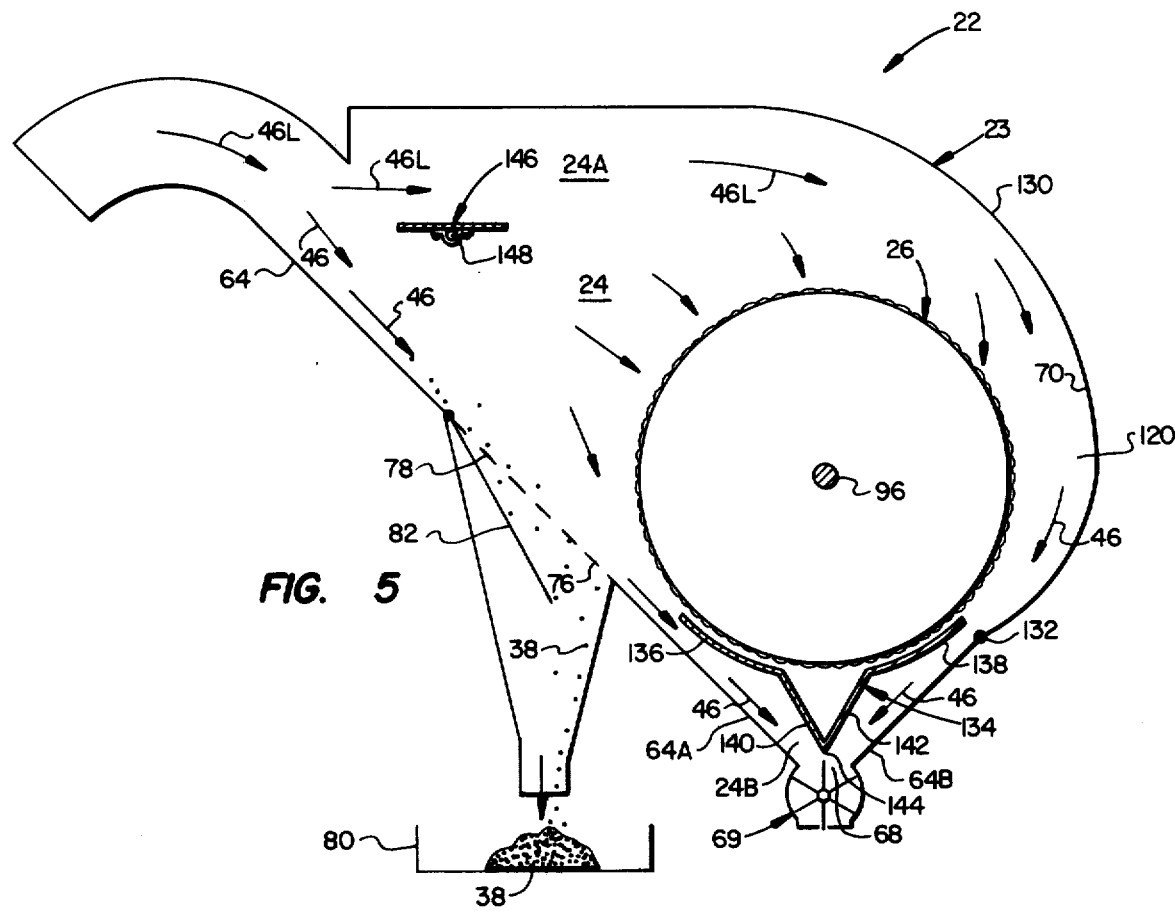
FIG. 5 is a side elevation view, partly in section, of an alternative rotary screen separator construction; and, FIG. 6 is a perspective view of a baffle assembly.
Figure 6:
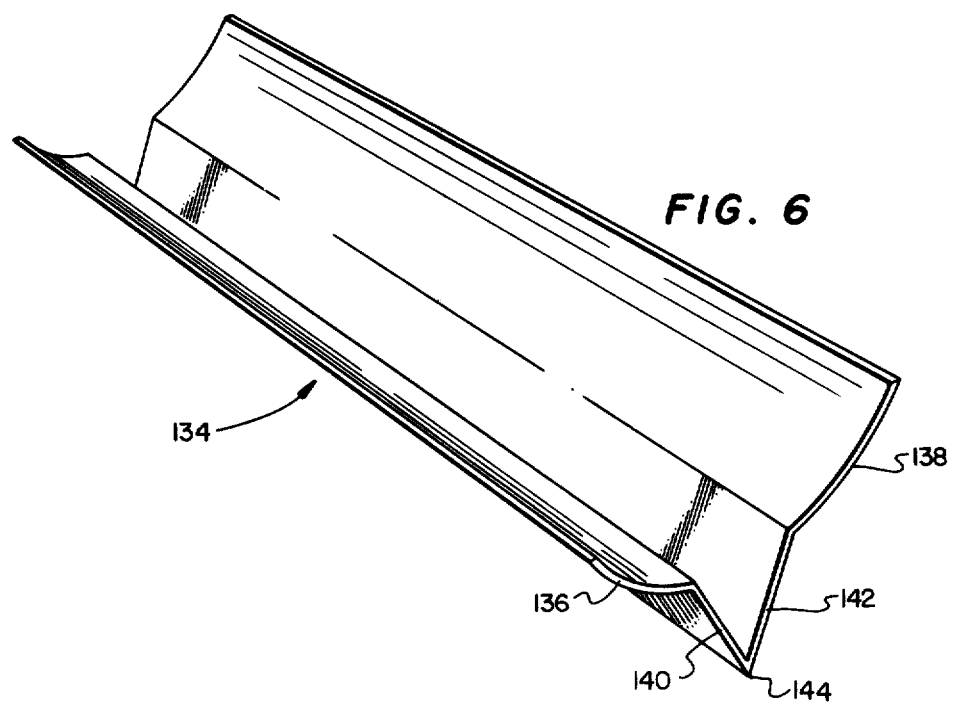

An alternative baffle arrangement is illustrated in FIGS. 5 and 6. In this arrangement, the pressure buffer effect is produced in part by the blocking effect of a baffle assembly 134. In this arrangement, the flow of the air stream through the rotating screen in the bottom region 24B of the settling chamber is blocked by first and second curved baffle portions 136, 138. The curved baffle portions are each disposed in parallel, radially spaced relation with the surface 92 of the rotatable screen 26.

The curved baffle portions are closely spaced to the cylindrical screen surface and block the flow of air through the lowermost portion of the screen which is overlapped by the curved baffle portions. The curved baffles and rectangular baffles are co-extensive with the width of the rotatable screen 26 and rotary valve 69. The baffles 136, 138 are spaced closely enough to the rotating screen to peel off or dislodge fiber deposits from the screen as it rotates, but is spaced far enough away from the screen to allow free rotation without rubbing interference.

Additionally, in this baffle arrangement, first and second rectangular baffle plates 140, 142 depend downwardly from the innermost end portions of the curved baffles 136, 138, respectively. The rectangular baffle plates 140, 142 extend transversely in blocking relation to the flow of air through the annular flow passage and converge to an apex 144 located directly above the entrance to the fiber product discharge outlet 68. The baffle assembly 134 produces an air flow dead zone over the rotor valve 69, thereby allowing fiber product to fall freely by gravity flow to the bottom of the settling chamber and into the rotary valve.

Again referring to FIG. 5, a rotatable deflector plate 146 is mounted for rotation on a shaft 148 within the settling chamber 24 intermediate the air stream inlet and the rotary screen separator 26. The deflector plate 146 is rectangular and is co-extensive with the width of the settling chamber. The purpose of the deflector plate is to direct the air flow entering the settling chamber evenly around the rotary screen. The shaft 148 extends through one side of the separator housing 23 and is provided with a handle (not illustrated) which allows adjustment of the angular orientation of the deflector plate 146 relative to the direction of the air stream as it enters the settling chamber. Without the deflector, most of the fiber product tends to accumulate on the lower left side of the separator assembly, which may cause bridging. By deflecting the entering air stream upwardly, substantially even amounts of fiber product are settled on both sides of the separator assembly, thereby reducing the likelihood of bridging.

Although preferred embodiments of the invention have been described in detail, it should be understood that various changes, alterations or substitutions can be made therein with departing from the spirit and scope of the invention as defined by the appended claims.

What is claimed is:

1. A method for extracting fiber product entrained in a moving air stream, comprising the steps:

(a) admitting the air stream including the entrained fiber product into a settling chamber in which a rotating screen is enclosed;
 (b) discharging the moving air stream through the rotating screen and out of the settling chamber while accumulating entrained fiber product on the rotating screen;
 (c) inducing an air flow gradient within the settling chamber whereby the air flow rate through the rotating screen is substantially smaller near the bottom of the settling chamber than it is near the top of the settling chamber;
 (d) settling the fiber product by gravity flow into the low flow rate region of the chamber; and,
 (e) discharging fiber product out of the low flow rate settling chamber region.

2. A separator assembly for use in a fiber processing system for extracting fiber product entrained in an air stream and delivering it to a discharge outlet for further processing, comprising, in combination:

settling means including a housing enclosing a settling chamber and having an air stream inlet, a fiber product discharge outlet, and an air stream outlet;
 a rotatable screen mounted for rotation within the settling chamber and interposed between the air stream inlet and the air stream outlet whereby fiber product is accumulated on said screen as the air stream flows through said screen and out of the air stream outlet;
 said settling chamber housing being radially spaced from said rotatable screen thereby defining an annular flow passage extending around said rotatable screen from the air stream inlet to the fiber product discharge outlet; and,
 baffle means disposed in the annular flow passage for impeding the flow of said air stream through the region of said annular passage lying between the fiber product discharge outlet and said rotatable screen.

3. The separator assembly as defined in claim 2, said baffle means comprising:

a baffle plate disposed in the annular flow passage intermediate said rotatable screen and product discharge outlet.

4. The separator assembly as defined in claim 2, said baffle means comprising:

a baffle assembly disposed in the annular flow passage intermediate said rotatable screen and product discharge outlet, said baffle assembly including first and second curved baffle portions each disposed in parallel, radially spaced relation with said rotatable screen and first and second generally rectangular baffle plates depending from said first and second curved baffle portions, respectively, said rectangular baffle plates extending transversely in blocking relation to the flow of air through the annular flow passage and converging to an apex near the entrance of the discharge outlet.

5. A separator assembly for use in a fiber processing system for extracting fiber product entrained in an air stream and delivering it to a discharge outlet for further processing, comprising, in combination:

settling means including a housing enclosing a settling chamber and having an air stream inlet, a fiber product discharge outlet, and an air stream outlet;
 a rotatable screen mounted for rotation within the settling chamber and interposed between the air stream inlet and the air stream outlet whereby the entrained fiber product is accumulated on the screen as the air stream flows through the screen and out of the air stream outlet;

said settling chamber housing being radially spaced from said rotatable screen thereby defining an annular flow passage around said rotatable screen from the air stream inlet to the product discharge outlet;

said settling chamber housing having first and second sidwall panels which converge downwardly to the fiber product discharge outlet; and, said rotatable screen being disposed relatively closely adjacent said downwardly converging sidewalls, the rotatable screen and converging sidewalls in combination defining a stricture in said annular flow passage and on opposite sides of said fiber product discharge outlet.

6. A method for extracting fiber product entrained in a moving air stream, comprising the steps:
   (a) admitting the air stream including the entrained fiber product into a settling chamber in which a rotating screen is enclosed;
   (b) discharging the moving air stream through the rotating screen and out of the settling chamber while accumulating entrained fiber product on the rotating screen;
   (c) impeding the flow of the air stream through the rotating screen in the bottom region of said settling chamber;
   (d) settling the fiber product by gravity flow into the bottom region of the settling chamber; and,
   (e) discharging fiber product out of the settling chamber.

7. A separator assembly for use in a fiber processing system for extracting fiber product entrained in an air stream and delivering it to a discharge outlet for further processing, comprising, in combination:

settling means including a housing enclosing a settling chamber and having an air stream inlet, a fiber product discharge outlet and an air stream outlet;

a rotatable screen mounted for rotation within the settling chamber and interposed between the air stream inlet and the air stream outlet whereby fiber product is accumulated on the screen as the air stream flows through the screen and out of the air stream outlet;

said settling chamber housing having a first sidewall panel which slopes downwardly from the airstream inlet to the fiber product discharge outlet on one side of said screen, a second sidewall panel which slopes upwardly from the fiber product discharge outlet on the opposite side of said screen, and a third sidewall panel having a curved section interconnecting the upwardly sloping panel and the air stream inlet, said sidewalls being radially spaced from said screen thereby defining an annular flow passage; and, said rotatable screen being disposed relatively closely adjacent said sloping sidewalls, the rotatable screen and sloping sidewalls in combination defining a stricture in said annular flow passage on each side of the product discharge outlet.

8. The separator assembly as defined in claim 7, including:

baffle means disposed in the annular flow passage for impeding the flow of said air stream through the region of said annular passage lying between the fiber product discharge outlet and said rotatable screen.

* * * * *